3,301,300
TRACTION STUDS FOR VEHICLE TIRES
Bernd Natter, Haus am Sonnenbichl 4, Reutte, Tirol, Austria
Filed Mar. 16, 1965, Ser. No. 440,096
Claims priority, application Austria, Mar. 16, 1964, A 2,250/64
3 Claims. (Cl. 152—210)

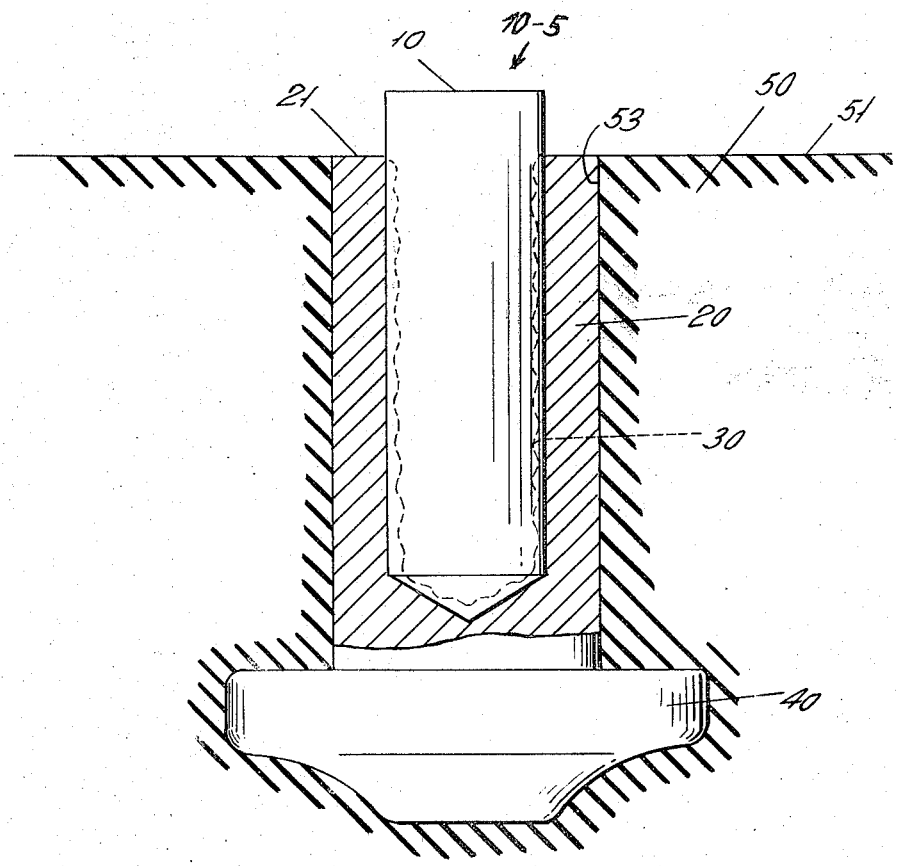

To increase their traction-engagement with the road, vehicle tires have been provided in the past with hard stud inserts distributed along the wear surface of the tire. The known tire studs usually consist of relatively thick pins of wear resisting hard composition, such as known compositions of the carbides of tungsten, molybdenum and the like, which are enclosed in a metallic enclosure or anchor sleeve. Each traction stud is inserted with its surrounding anchor sleeve within the tire body. The inner end of the stud anchor sleeve has a wider anchor end portion held clamped within the tire body to suppress extraction withdrawal or loss of the stud. The outer end of the stud projects beyond its anchor sleeve for engagement with the road surface and providing the desired traction forces.

Such known tire traction studs have proven deficient because of the difficulties in providing a reliable and effective junction between the metal anchor sleeve and the surrounding hard stud. Soft solder junctions lack the required strength. Hard solder junctions introduce strains between the stud and its anchor sleeve because of their different thermal expansion coefficients.

Among the objects of the invention are tire-traction studs which overcome these difficulties.

In accordance with the invention, the anchoring sleeve of the traction stud is formed by and is joined to the stud by surrounding the stud with a layer body of metal powder particles and subjecting the composite body to a sintering treatment which joins the metal powder particles of the surrounding thin layer body into a hard sleeve which is affixed by a reliable strong sintering junction to the stud. In such sintering operation, the metal powder particle body of the anchoring sleeve encloses all but the outer end portion of the traction stud and the metal particles of this powder body are sintered to each other and to the surrounded stud.

The anchoring sleeve may be produced by known powder-metallurgy techniques with powder particles of iron, iron alloys, copper-base alloys, such as bronze and of other metals and metal alloys having similar characteristics. Iron melts at 1535° C., steel at about 1375° C., bronze containing 10% and 20% zinc at 1005° C. and 890° C., respectively. The sintering treatment should be effected in a known manner within an atmosphere having a small carbon content to suppress carbon loss from the metal-carbide composition of the traction stud.

It is advantageous to embody in the metal powder of the anchor sleeve an additional metal which causes diffusion of its metal contents into the surrounded stud and forming therein a diffused junction layer containing their two metal contents alloyed with each other.

For anchoring sleeves of sintered iron, a powder addition up to about 10% of nickel is desirable. After the sintering operation, the anchoring sleeve with its surrounded traction stud may be subjected to follow-up compression or calibration to give the composite stud structure its final shape and dimensions.

The drawing shows an example of a traction stud of the invention. It comprises an elongated traction stud 10 of hard metal, such as the known metal carbide compositions set forth above, produced in a conventional way by powder-metallurgy technique or by casting. The so produced traction stud 10 is embedded in the anchoring enclosure or sleeve 20. To this end, such traction stud has compacted around the major part of its length up to the level 21 a powder body 20 of iron particles containing an addition of 4% nickel powder. The resulting composite body having, for example, the shape shown in the drawing, is subjected to a sintering in a hydrogen containing atmosphere. As an example, good results are obtained with sintering for about one-half to one hour. To suppress loss of carbon from the carbide body, a large quantity of such studs are held in a carbon crucible while subjected to the sintering treatment. In the sintering treatment, the body portions of the traction stud 10 and its surrounding anchor sleeve 20 diffuse each one into the other forming along their junction surfaces a diffused junction region, such as indicated at 30.

The entire length of the traction-stud anchoring sleeve 20 is held embedded and elastically clamped by the surrounding rubber body 50 of the tire which has along its traction surface 51 an array of recesses 53 shaped to receive and clampingly hold therein in a conventional way the composite tire stud 10–5 with its anchoring sleeve. The inner embedded end of the anchoring sleeve 20 has a conventionally-shaped wider anchor section 40 which is retained in a correspondingly shaped inner and wider end portion of tire recess 53.

The principles underlying the invention described in connection with specific exemplifications will suggest other modifications and applications thereof. It is accordingly desired that the appended claims shall not be limited to specific examples shown or described herein.

There is claimed:
1. For a vehicle tire having a tire body establishing traction engagement with a road and the like,
   an axially extending elongated traction stud of hard wear-resistant metallic carbide composition to be held axially embedded in a generally radial direction in said tire body with an outer stud portion of its length establishing road-traction engagement,
   an enclosure layer of metallic powder particles having a melting temperature between 800 and 1600° C. surrounding the length of said stud held embedded within said tire body, which powder particles have been sintered to each other and to the surrounded length of said stud at elevated temperature within an oxidation suppressing atmosphere and constituting an anchoring sleeve retaining said stud in said tire body while the outer stud end is subjected to traction engagement with the road.
2. A traction stud for a tire body as claimed in claim 1,
   the metal particles of said stud surrounding enclosure layer consisting essentially of a metal selected from the group consisting of iron and iron base alloys and containing an addition of a binder metal constituting up to 10 weight percent of said enclosure layer.

3. A traction stud for a tire body as claimed in claim 1, the metal particles of said stud surrounding enclosure layer consisting essentially of a metal selected from the group consisting of iron and iron base alloys and containing an addition of nickel constituting up to 10 weight percent of said enclosure layer.

References Cited by the Examiner

UNITED STATES PATENTS

| | | | |
|---|---|---|---|
| 2,409,307 | 10/1946 | Patch et al. | 29—182.3 X |
| 2,652,520 | 9/1953 | Studders | 29—182.2 |
| 2,652,876 | 9/1953 | Eisner | 152—210 |

ARTHUR L. LA POINT, *Primary Examiner.*

C. W. HAEFELE, *Assistant Examiner.*